(12) United States Patent
Inukai

(10) Patent No.: US 8,014,174 B2
(45) Date of Patent: Sep. 6, 2011

(54) IMAGE FORMING APPARATUS

(75) Inventor: Katsumi Inukai, Iwakura (JP)

(73) Assignee: Brother Kogyo Kabushiki Kaisha, Nagoya-shi, Aichi (JP)

( * ) Notice: Subject to any disclaimer, the term of this patent is extended or adjusted under 35 U.S.C. 154(b) by 760 days.

(21) Appl. No.: 12/125,722

(22) Filed: May 22, 2008

(65) Prior Publication Data

US 2008/0298091 A1    Dec. 4, 2008

(30) Foreign Application Priority Data

Jun. 1, 2007    (JP) ................. 2007-147042

(51) Int. Cl.
*H02M 3/335* (2006.01)
*H02H 7/125* (2006.01)
(52) U.S. Cl. .......... 363/18; 363/16; 363/19; 363/56.01; 363/97
(58) Field of Classification Search ............ 363/16, 363/18, 19, 56.01, 97
See application file for complete search history.

(56) References Cited

U.S. PATENT DOCUMENTS

| | | | | |
|---|---|---|---|---|
| 4,758,937 A | * | 7/1988 | Usui et al. | 363/19 |
| 4,763,235 A | * | 8/1988 | Morita | 363/19 |
| 5,995,382 A | * | 11/1999 | Miyazaki et al. | 363/19 |
| 6,078,508 A | * | 6/2000 | Okamura et al. | 363/19 |
| 6,236,577 B1 | * | 5/2001 | Bando | 363/19 |
| 6,525,948 B2 | * | 2/2003 | Hsu | 363/56.11 |
| 6,731,892 B2 | | 5/2004 | Doi | |
| 2003/0072583 A1 | | 4/2003 | Doi | |
| 2007/0041221 A1 | * | 2/2007 | Phadke et al. | 363/16 |

FOREIGN PATENT DOCUMENTS

| | | |
|---|---|---|
| JP | 07-059343 | 3/1995 |
| JP | 07-274501 | 10/1995 |
| JP | 2003-134821 A | 5/2003 |
| JP | 2006-030554 | 2/2006 |
| JP | 2006-039133 | 2/2006 |
| JP | 2006-139519 | 6/2006 |

* cited by examiner

*Primary Examiner* — Bao Q Vu

(74) *Attorney, Agent, or Firm* — Banner & Witcoff, Ltd.

(57) ABSTRACT

The present invention can include an image forming apparatus having an electrical load, a supplying circuit configured to supply an electrical power to the electrical load, and an output circuit configured to output a voltage according to a current value of the electrical power being supplied to the electrical load. The present invention may also provide for a controller configured to control an electrical current flowing in the electrical load based on an output voltage value of the output circuit as a feedback value, and an inhibiting circuit configured to inhibit a reverse current to flow in the output circuit when the supplying circuit is turned off.

11 Claims, 8 Drawing Sheets

IMAGE FORMING APPARATUS

CROSS REFERENCE TO RELATED APPLICATION

This application claims priority from Japanese Patent Application No. 2007-147042 filed Jun. 1, 2007. The entire content of this priority application is incorporated herein by reference.

TECHNICAL FIELD

The disclosure relates to an image forming apparatus, and more particularly, to a control of power supply to an electrical load in the image forming apparatus.

BACKGROUND

An image forming apparatus comprises, for example, a power supply device for supplying power to an electrical load, such as a transfer roller. The power supply device defines a current value of power to be supplied to an electrical load as a control target value, and conducts a constant current control for keeping this control target value at a target value. For this purpose, a detection circuit, which detects the above-mentioned control target value and outputs a voltage signal according thereto, is provided in the power supply device, and a control circuit of the power supply device is configured to receive a voltage value of the above-mentioned voltage signal as a feedback value.

A control circuit in a power supply device is generally configured on the basis of receiving a positive voltage value as a feedback value. However, the polarity of the feedback value is inverted to negative at the time when, for example, the power supply device is turned off. If so, the above-mentioned control circuit receives a voltage outside of a prescribed range (for example, an assured range), and thus may possibly be badly affected.

SUMMARY

The image forming apparatus according to an aspect of the present invention includes an electrical load, a supplying circuit, an output circuit, a controller and an inhibiting circuit. The supplying circuit is configured to supply an electrical power to the electrical load. The output circuit is configured to output a voltage according to a current value of the electrical power being supplied to the electrical load. The controller is configured to control an electrical current flowing in the electrical load based on an output voltage value of the output circuit as a feedback value. The inhibiting circuit is configured to inhibit a reverse current to flow in the output circuit when the supplying circuit is turned off.

According to the present invention, an inhibiting circuit inhibits a reverse current (an electrical current flowing in an opposite direction to the electrical current of a supply means in operation) to flow into an output circuit, and thus, the feedback value can be kept within a prescribed range.

BRIEF DESCRIPTION OF THE DRAWINGS

Illustrative aspects in accordance with the invention will be described in detail with reference to the following figures wherein.

DETAILED DESCRIPTION

<Aspect 1>

Aspect 1 of the present invention is explained in reference to FIGS. 1 to 5.

(The Structure of a Laser Printer)

Figure 1:
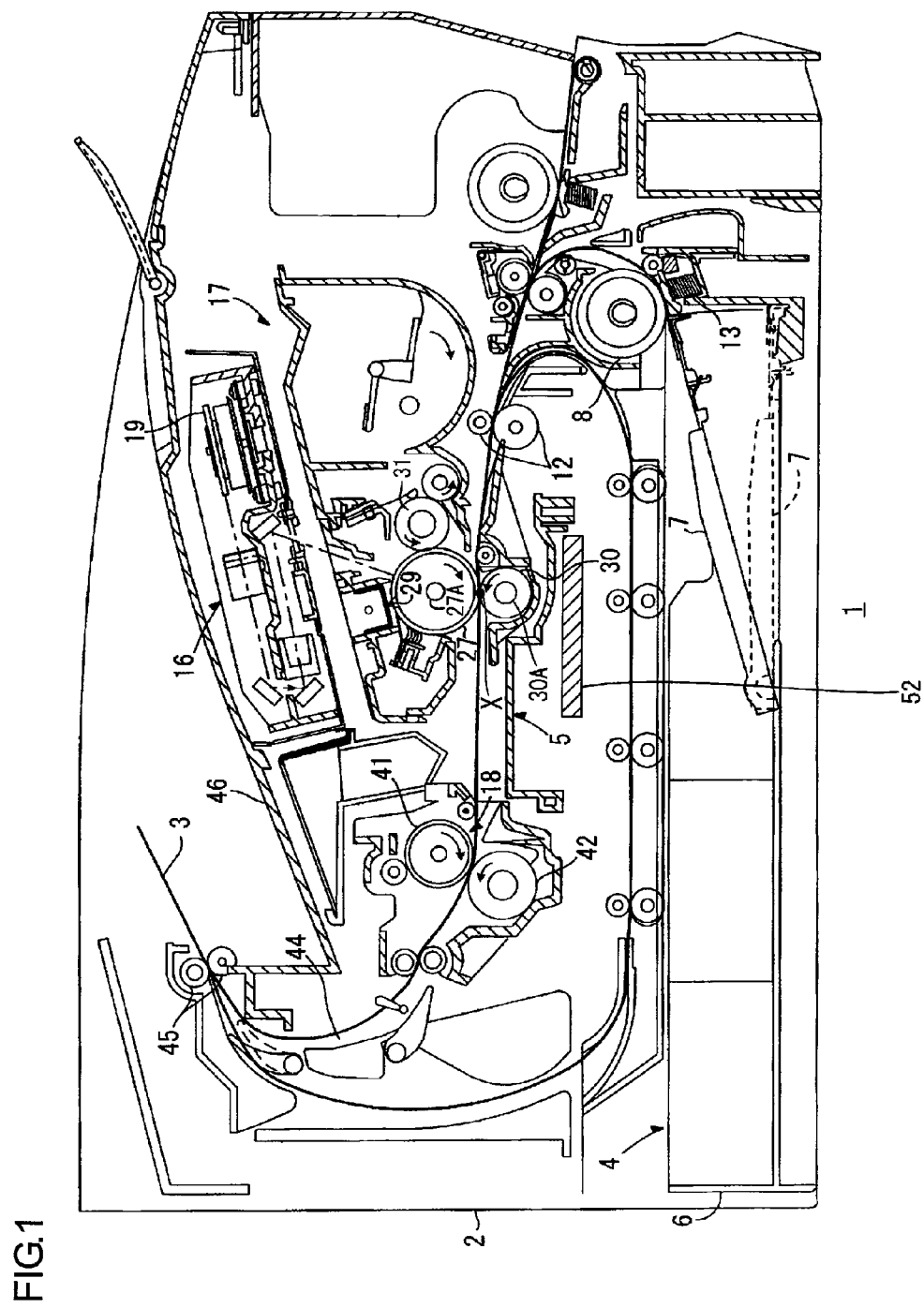
FIG. 1 is a sectional side view illustrating a main part a printer according to Aspect 1 of the present invention.

FIG. 1 is a sectional side view illustrating a main part structure of a laser printer (hereinafter referred to as "printer 1": one example of an image forming apparatus). Additionally, the following is described as referring to FIG. 1, in which the right side is the front side of the printer 1, and the left side is the rear side of the same. In FIG. 1, the printer 1 comprises in its body frame 2, such as, a feeder 4 for feeding a paper sheet 3 (one example of a recording medium which can also include plastic sheets and the like) and an image forming unit 5 for forming an image on the fed paper sheet 3.

(1) Feeder

The feeder 4 comprises a feed tray 6, a pressing plate 7, a feed roller 8 and a registration roller 12. The pressing plate 7 is rotatable about its rear end, and the paper sheet 3 stacked on top thereof is pressed toward the feed roller 8. The paper sheet 3 on the pressing plate 7 is then fed at every rotation of the feed roller 8 one by one.

The fed paper sheet 3 is then registered by the registration roller 12 before being delivered to a transfer position X. In addition, the transfer position X is where a toner image on a photoreceptor drum 27 is transferred onto the paper sheet 3, and also, where the photoreceptor drum 27 (one example of a photoreceptor) and the transfer roller 30 (an electrical load: one example of a transfer means) contacts each other.

(2) Image Forming Unit

The image forming unit 5 comprises a scanning unit 16, a process cartridge 17, and a fixing unit 18.

The scanning unit 16 comprises, such as, a laser emitting unit (not shown) and a polygon mirror 19. A laser light L emitted from the laser emitting unit is irradiated on the surface of the photoreceptor drum 27 while being deflected by the polygon mirror 19.

Additionally, the process cartridge 17 comprises a developing roller 31 (one example of a developing means), a photoreceptor drum 27, a charger 29 (e.g. of the scorotron-type), and a transfer roller 30. In addition, the photoreceptor drum 27 is grounded at its drum shaft 27A.

The charger 29 uniformly charges the surface of the photoreceptor drum 27 to a positive polarity. After that, the surface of the photoreceptor drum 27 is exposed with the laser light L emitted from the scanning unit 16, thereby forming an electrostatic latent image. Next, the toner supported on the surface of the developing roller 31 is fed to an electrostatic latent image formed on the photoreceptor drum 27, and then is developed.

The transfer roller 30 comprises a metallic roller shaft 30A, to which an applying circuit 60 mounted to a high-voltage power circuit substrate 52 is connected, such that a transfer voltage V1 (negative voltage) is applied from the applying circuit 60 at the time of transfer operation.

The fixing unit 18 heat-fixes the toner on the paper sheet 3 during the passage of the paper sheet 3 between a heating roller 41 and a pressing roller 42. The heat-fixed paper sheet 3 is then discharged onto a catch tray 46 via a paper discharge path 44.

(The Structure of the Applying Circuit)

Figure 2:
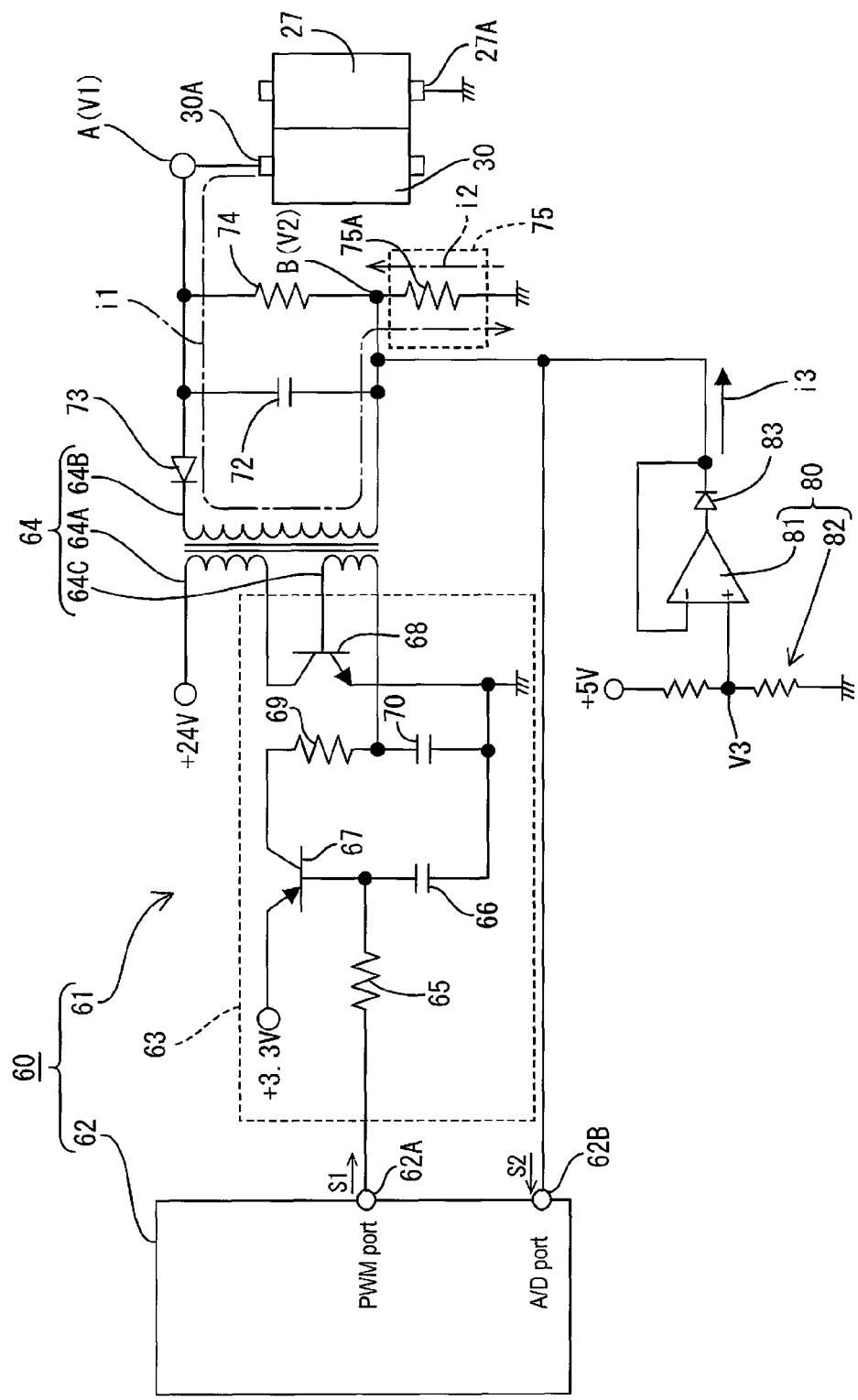
FIG. 2 is a circuit diagram illustrating a main part an applying circuit.

FIG. 2 shows a block diagram of the main part structure of the applying circuit 60 for applying the transfer voltage V1 to the transfer roller 30. This applying circuit 60 is configured to comprise a control circuit 62 and a high-voltage output circuit 61 (one example of a supplying circuit). The high-voltage output circuit 61 comprises a driving circuit 63 and a transformer 64.

The driving circuit 63 receives a PWM signal S1 from the control circuit 62, and then passes an oscillation current according to the PWM value (duty ratio) of this PWM signal S1 to a primary side wiring 64A of the transformer 64. More specifically, the driving circuit 63 includes an integral circuit composed of a resistor 65 and a capacitor 66, and transistors 67 and 68 as a switching element. This integral circuit integrates the PWM signal S1 sent from the control circuit 62, and gives the result to the base of the transistor 67. This transistor 67 is connected with a first power source (for example, +3.3 [v]) via its emitter, while being connected with the integral circuit, that is composed of the resistance 69 and the capacitor 70, via its collector. The output of this integral circuit is connected with the base of the transistor 68 via an auxiliary wiring 64C of the transformer 64.

The primary side wiring 64A of the transformer 64 is connected between a second power source (for example, +24 [v]) and the above-mentioned transistor 68. Both ends of a secondary side wiring 64B of the transformer 64 are connected with a rectifying circuit composed of a diode 73 and the resistor 74. And also, a smoothing capacitor 72 is connected in parallel with the resistor 74. In addition, a connecting point A between the diode 73 and the resistor 74 is connected with a roller shaft 30A of the transfer roller 30.

Moreover, the high-voltage output circuit 61 comprises a current detection circuit 75 (one example of an output circuit). The current detection circuit 75 comprises a detection resistance (also called as "feedback resistance") 75A connected between the above-mentioned resistor 74 and the ground for outputting a detection signal S2 of the voltage value V2 according to the transfer current i1 (one example of the electrical current flowing in the electrical load) flowing in the transfer roller 30.

Such a configuration as this enables the driving circuit 63 to self-oscillate according to a PWM value of the PWM signal S1 sent from the control circuit 62, thereby sending the oscillation current to the primary side wiring 64A of the transformer 64. The output from the transformer 64 is smoothed and rectified before being given to the roller shaft 30A of the transfer roller 30. This enables the negative transfer voltage V1 to be applied to the roller shaft 30A of the transfer roller 30, and at the same time, the transfer current i1 to flow from the transfer roller 30 toward the detection resistance 75A.

The control circuit 62 includes a CPU for the purpose of outputting the PWM signal S1 from the PWM port 62A to the driving circuit 63 with the control thereof, and obtains the voltage value V2 of the detection signal S2 sent from the current detection circuit 75 from an A/D port 62B as a feedback value. According to the present aspect, for example, when the developer image on the photoreceptor drum 27 is transferred onto the paper sheet 3, the control circuit 62 feedbacks the voltage value V2 of the detection signal S2 sent from the current detection circuit 75, and then conducts a constant current control to the high-voltage output circuit 61 for adjusting the PWM value of the PWM signal S1 so that the transfer current i1 settles to a prescribed target value (for example, −10 to −11.mu.A)

(The Structure for Preventing a Reverse Current)

As mentioned above, when the high-voltage output circuit 61 is in operation, the transfer current i1 (the current flowing in the direction of the dashed-dotted line in FIG. 2) flows in the detection resistor 75A, and thus, the voltage value V2 of the above-mentioned connecting point B indicates a positive number (for example, 1.0 to 3.3V). And in the control circuit 62, the assured range of the voltage value to be inputted in the A/D port 62B is set to a prescribed positive range. This enables a negative voltage to be applied to the connecting point B when a reverse current (the current flowing in the direction opposite to the transfer current i1 at the time of operation) i2 (the dashed-two dotted line in FIG. 2) flows into the detection resistance 75A. In short, the polarity of the feedback value inverts. If so, the voltage outside of the assured range is inputted into the A/D port 62B, and may cause, for example, a breakdown of circuits such as an A/D converter inside of the control circuit 62.

Such a reverse current may occur, for example, right after the turning off of the applying circuit 60. More particularly, the applying circuit 60 is turned off after, for example, a completion of the transfer action to the paper sheet 3, and waits ready until the next print job is requested. Right after this turning off, a halt of the oscillation of the driving circuit 63 causes the smoothing capacitor 72 to conduct a discharge via the resistor 74 as well as a discharge via the resistance 75A and the transfer roller 30 as an electrical load, thereby rapidly dropping the voltage value V2 of the connecting point B close to a ground level. In response to this, the charge held by the electrical load is discharged via the resistor 74, resistor 75A, the transfer roller 30 as an electrical load, and the photoreceptor drum 27, and therefore, this discharge delays due to the large impedance of its discharge path. This causes the voltage value V2 of the connecting point B to grow temporarily higher than the voltage value V1 of the connecting point A, thereby flowing a reverse current i2 to the detection resistance 75A.

Therefore, an inhibiting circuit 80 (one example of an inhibiting circuit) for inhibiting this reverse current i2 is provided in the present aspect. The inhibiting circuit 80 plays a role of inhibiting the above-mentioned feedback value to decrease lower than the positive lower limit value (for example, 0.1 [v]). More particularly, the inhibiting circuit 80 comprises an operational amplifier 81 and a voltage generating circuit 82. A diode (one example of a rectifying device) 83 is connected with the operational amplifier 81 by being provided in the feedback route from the output terminal to the inversion input terminal. The forward direction of the diode 83 is regarded as the above-mentioned feedback direction. The voltage generating circuit 82 is composed of, for example, a voltage division circuit for dividing the third power source (for example, +5 [v]), and provides its partial pressure voltage V3 (for example, 0.1V) to a non-inversion input terminal of the operational amplifier 81.

When the voltage value V2 of the connecting point B (in short, the feedback value) is larger than the above-mentioned positive lower limit value, such a configuration as this inhibits an invasion of the transfer current i1 into the inhibiting circuit 80 with the diode 83. Consequently, the feedback value is not affected by the inhibiting circuit 80, and indicates a value according to the transfer current i1. On the other hand, for example, when the feedback value was about to drop below the positive lower limit value after turning off the applying circuit 60, a current i3 flowing from a path connected with the operational amplifier 81 (one example of a different path) flows into the transfer roller 30 side, getting ahead over the above-mentioned reverse current i2 that may flow in a path to be detected by the current detection circuit 75 (one example of a path with an output circuit provided therein). This inhibits the feedback value to drop below the positive lower limit value.

(The Effect of the Present Aspect)

According to the present aspect, the inhibiting circuit 80 inhibits the reverse current i2 to flow in the detection resistance 75A. This inverts the feedback value from the positive polarity to negative polarity, thereby preventing the feedback value outside of the assured range to be given to the control circuit 62.

And also, other configurations X, Y, and Z to be mentioned below may be adopted as a configuration for inhibiting the reverse current i2 to flow in the detection resistor 75A.

Figure 3:
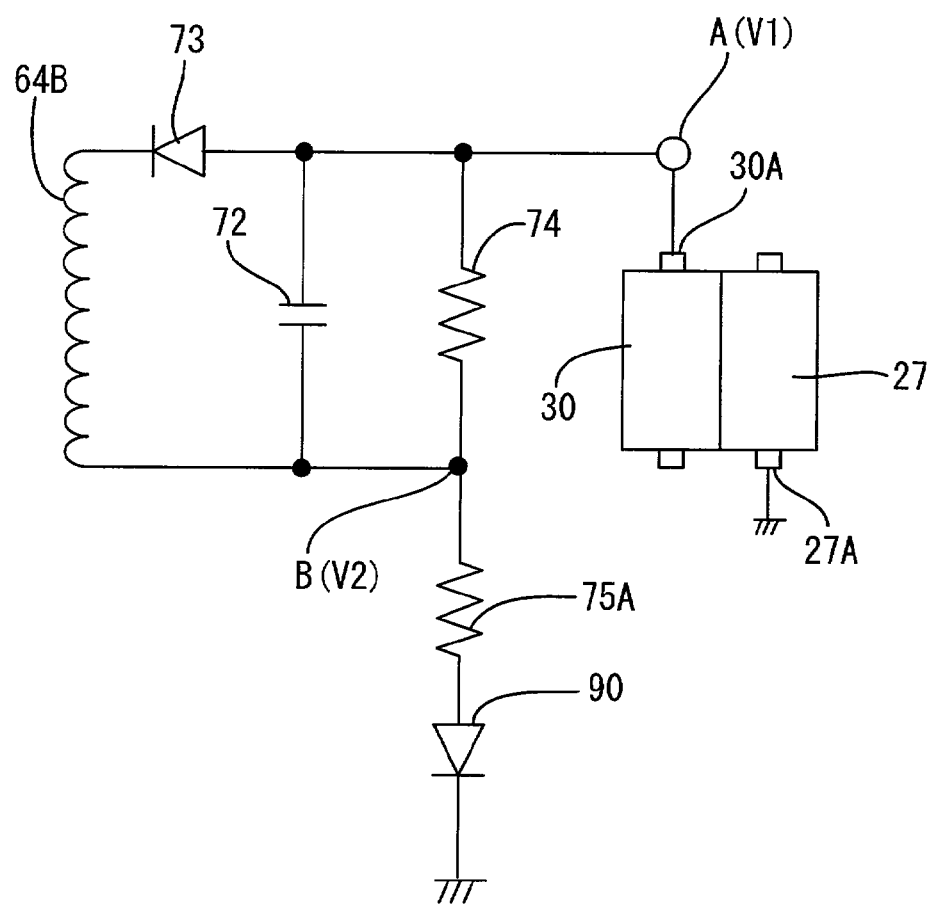
FIG. 3 is a circuit diagram illustrating a partial structure of a configuration X.

(Configuration X): as shown in FIG. 3, a diode 90 as a rectifying device is provided in a path to be detected by the current detection circuit 75.

Figure 4:
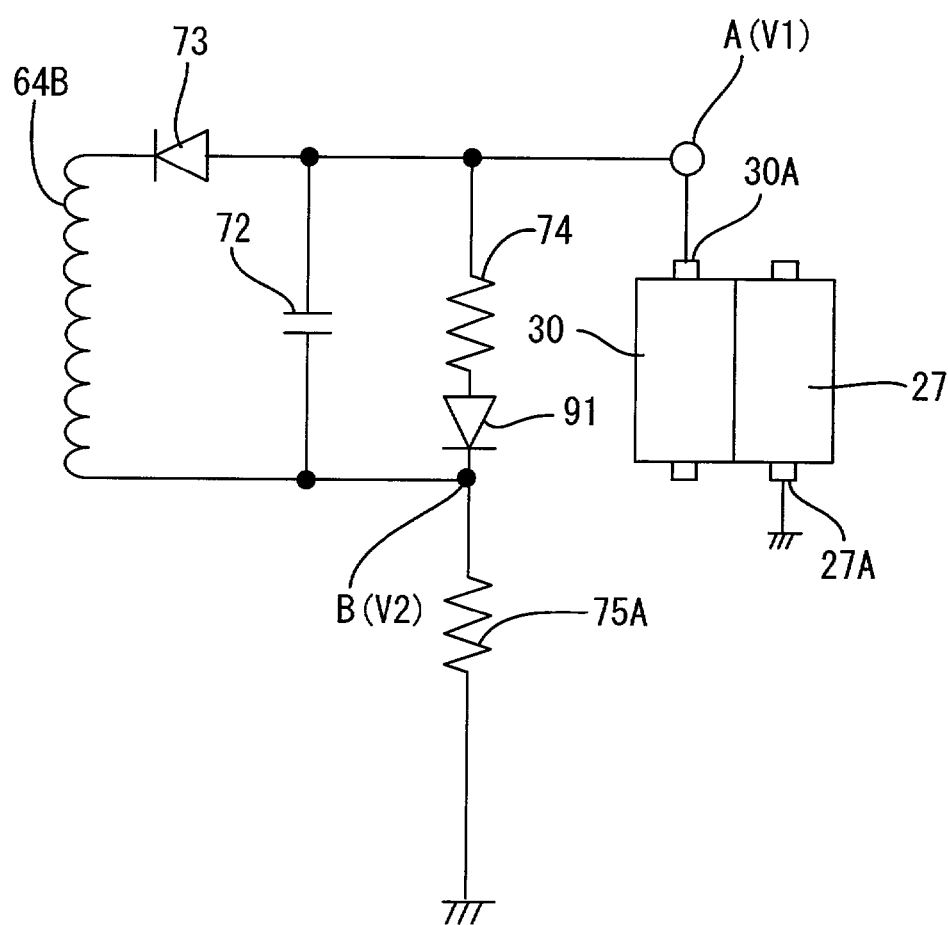
FIG. 4 is a circuit diagram illustrating a partial structure of a configuration Y.

(Configuration Y): as shown in FIG. 4, a diode 91 as a rectifying device is provided in series with the resistance 74 in between both the ends of the secondary side wiring 64B of the transformer 64.

Figure 5:
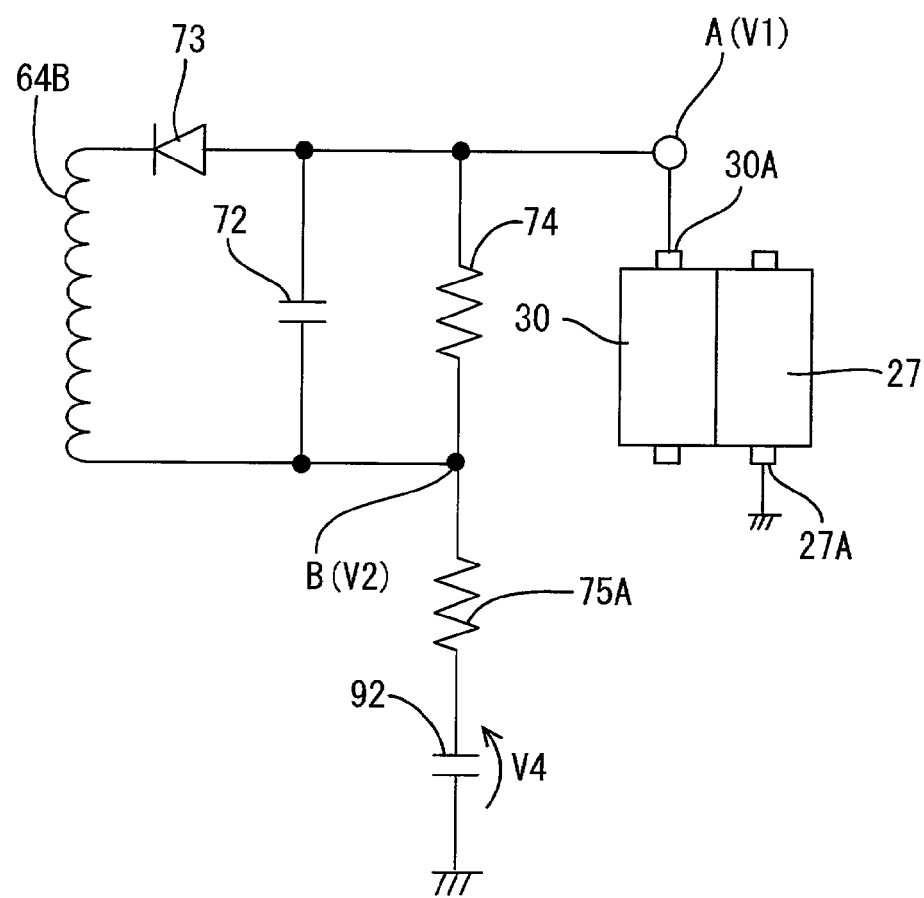
FIG. 5 is a circuit diagram illustrating a partial structure of a configuration Z.

(Configuration Z): as shown in FIG. 5, a bias circuit 92 for applying a positive bias voltage V4 to the area between the detection resistor 75A and the ground is provided.

In this regard, in the configuration X, some errors may be observed in the feedback value relative to the actual value of the transfer current i1 due to the voltage drop amount of the diode 90. In the configuration Y, a diode 91 having sufficient pressure tightness against the high-voltage to be applied to both the ends of the secondary side wiring 64B needs to be employed, however, such a diode with high pressure tightness generally has a large leakage current. And also, in the configuration Z, the dynamic range of the feedback value narrows only for the amount of the bias voltage V4. In response, according to the present aspect, the feedback value is inhibited to drop below the positive lower limit value, by supplying the current i3 to the side of the transfer roller 30 preferentially from a different path than the path to be detected by the current detection circuit 75. Consequently, an occurrence of the leakage current as well as a narrowing of the dynamic range can be inhibited.

Moreover, when the feedback value indicates the positive lower limit value, it is prevented to drop below the positive lower limit value by the output current i3 that flows from the operational amplifier 81 into the transfer roller 30. This enables the positive lower limit value to be stabilized, thereby easily securing the dynamic range of the feedback value.

And also, the positive lower limit value is set to a smaller value than the feedback value (for example, 1.0 to 3.3 [v]) at the time when the applying circuit 60 is activated and the transfer roller 30 is operating the transfer. Consequently, the feedback value reaches to the positive lower limit value during the transfer operation of the transfer roller 30, so that a normal feedback control is secured.

In addition, the control circuit 62 determines an irregularity if the feedback value is higher than or equal to the reference value when the applying circuit 60 is at rest. At this moment, the control circuit 62 functions as a determination means. Here, when the positive lower limit value is temporarily increased greater than the reference value, an irregularity might be misjudged since the feedback value is kept to the value greater than the reference value by the inhibiting circuit 80 despite no irregularity has been occurred. The present aspect therefore sets the positive lower limit value to be less or equal to the reference value.

<Aspect 2>

Figure 6:
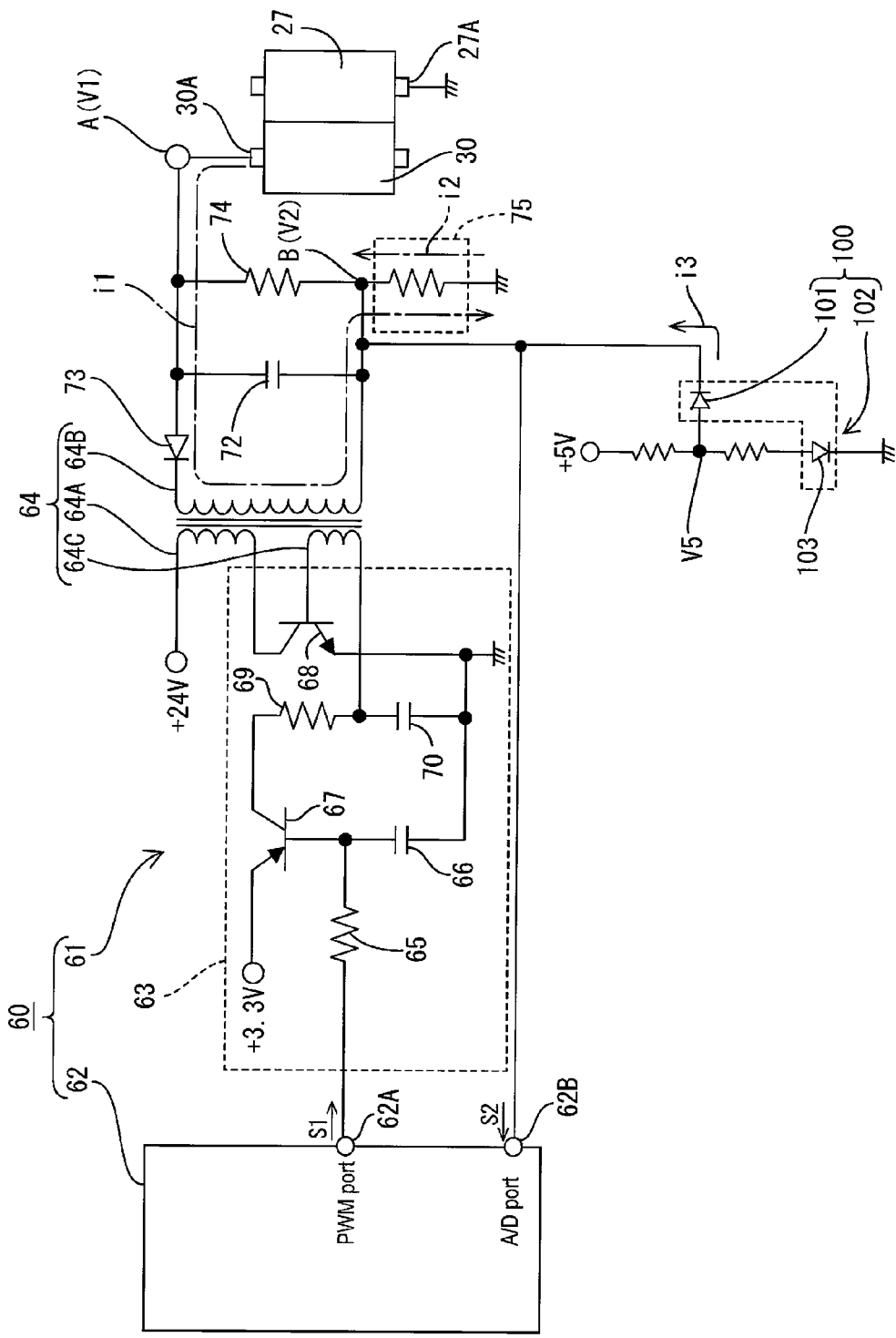
FIG. 6 is a circuit diagram illustrating a main part structure of an applying circuit according to Aspect 2 of the present invention.

FIG. 6 shows Aspect 2 according to the present invention. The difference from the above-mentioned Aspect 1 resides in the configuration of an inhibiting circuit, and the rests are similar to the Aspect 1. Therefore, a repetitive description is omitted by allocating the same symbols to the same elements as Aspect 1, thereby describing only the different elements.

As illustrated in FIG. 6, an inhibiting circuit 100 (one example of an inhibiting circuit) of the present aspect comprises a first diode 101 (one example of a first rectifying device) and a voltage generating circuit 102 (one example of a generating circuit). This first diode 101 is connected with the connecting point B via the cathode, thereby supplying a generated voltage V5 (one example of an input voltage) of the voltage generating circuit 102 to the anode. This generated voltage V5 is set to a value (0.8 [v]) higher by only the amount of the above-mentioned positive lower limit value (0.1 [v]) than a threshold voltage (0.7 [v]) of the first diode 101.

The voltage generating circuit 102 is configured having a plurality of resistors and a second diode 103 (one example of a second rectifying device) connected in series in between a third power source (for example, +5 [v]) and the ground.

Such a configuration prevents the transfer current i1 to flow into the inhibiting circuit 100 with the first diode 101, when the feedback value (the voltage value V2 of the connecting point B) is greater than the positive lower limit value. Consequently, the feedback value indicates a value in accordance with the transfer current i1 without being affected by the inhibiting circuit 100. On the other hand, for example, when the feedback value is about to drop below the positive lower limit value since the applying circuit 60 is turned off, a current i3 flowing from a path connected with the first diode 101 (one example of a different path) flows into the side of the transfer roller 30, getting ahead over the above-mentioned reverse current i2 that may flow in a path to be detected by the current detection circuit 75. This inhibits the feedback value to drop lower than the positive lower limit value.

According to the present aspect, in addition to the effect of the above-mentioned Aspect 1, an inhibiting circuit can be realized with a simple structure.

Moreover, the generated voltage V5 to be given to the first diode 101 includes the forward voltage of the second diode 103. This enables a generation of a steady voltage, compared with the configuration in which, for example, the generated voltage V5 is generated with a voltage division circuit of only resistors, and therefore, the feedback value can be surely inhibited to drop lower than the positive lower limit value.

Moreover, the first diode 101 and the second diode 103 are provided inside of the same package. This configuration does not require unevenness in the production of the both, and therefore enables the temperature characteristic difference to be regulated, thereby preventing the feedback value to drop lower than the positive lower limit value.

<Aspect 3>

Figure 7:
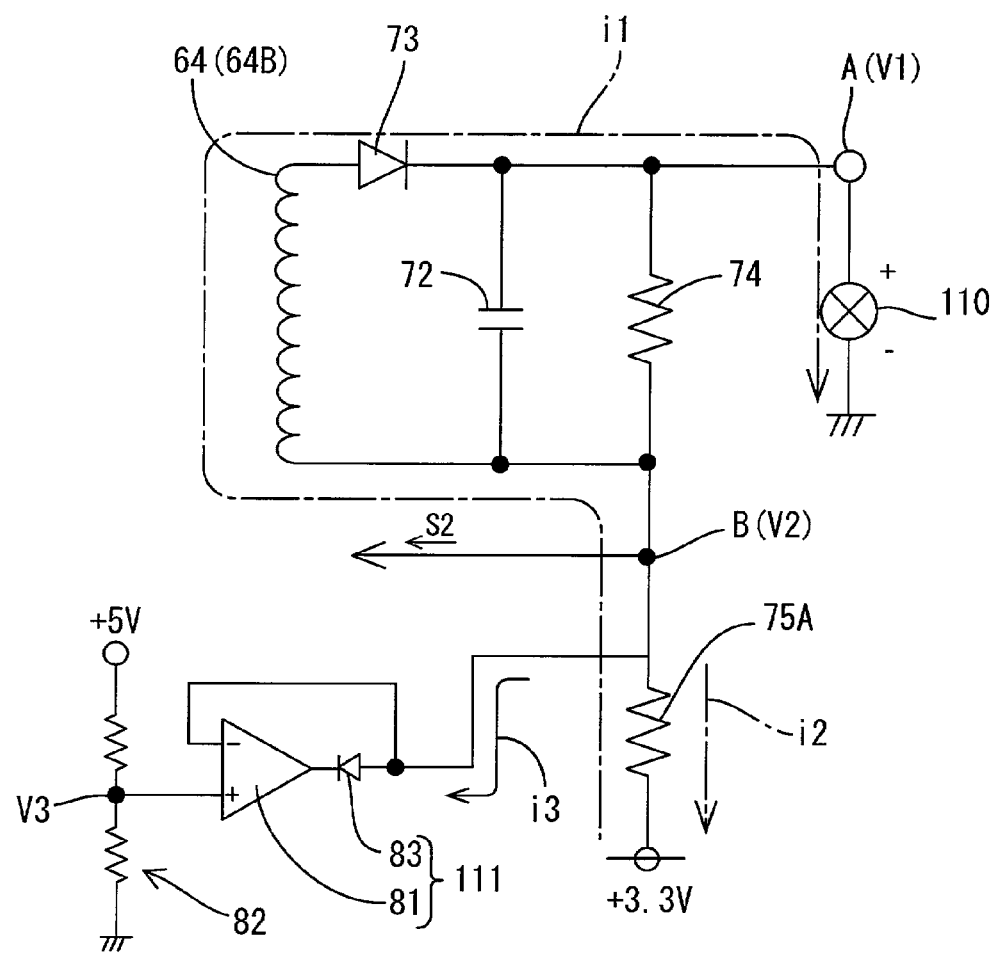
FIG. 7 is a circuit diagram illustrating a main part structure of an applying circuit according to Aspect 3 of the present invention.

FIG. 7 shows Aspect 3 according to the present invention. With respect to Aspect 1, in which a negative voltage of an electrical load 110 is applied, a positive voltage is applied in Aspect 3, and that is so say, the configuration of an inhibiting circuit is partially different. Therefore, a repetitive description is omitted by allocating the same symbols to the same elements as Aspect 1, thereby describing only the different elements.

In FIG. 7, a partial configuration in which a positive voltage is applied to the electrical load 110 is illustrated. In this configuration, the connecting direction of the diode 73 in the rectifying circuit is opposite to the circuit shown in FIG. 2, and furthermore, one end of the detection resistor 75A is connected with a fourth power source (for example, 3.3 [v]), not with the ground. In this configuration, when the transformer 64 is turned off, the smoothing capacitor 72 discharges to rapidly bring the voltage value V2 of the connecting point B close to 3.3 [v], while on the other hand, the discharge in the electrically loaded side with larger impedance in the discharge path delays. This causes the reverse current i2 to temporally flow from the electrical load to the resistors 74 and 75. If so, the feedback value rises higher than the voltage value of the above-mentioned fourth power source, thereby applying a voltage outside of the assured range to the control circuit 62.

In response, the inhibiting circuit 111 in the present aspect plays a role of inhibiting the above-mentioned feedback value to grow higher than the upper limit value (for example, +3.3 [v]). For the above purpose, the diode 83 is oppositely-connected in the inhibiting circuit 111 relative to the inhibiting circuit 80 in the above-mentioned FIG. 2. And also, the generated voltage V3 of the voltage generating circuit 82 is set to the same level as the above-mentioned upper limit value.

When the voltage value V2 of the connecting point B (in short, the feedback value) is lower than the upper limit value, such a configuration as this enables the feedback value to indicate the value according to the transfer current i1 without being affected by the inhibiting circuit 111. On the other hand, for example, when the feedback value was about to grow higher than the upper limit value after turning off the applying circuit 60, a current i3 flowing from the side of the transfer roller 30 is supplied to a path connected with the operational amplifier 81 (one example of a different path), getting ahead over the above-mentioned reverse current i2 that may flow in a path to be detected by the current detection circuit 75 (one example of a path with an output circuit provided therein). This inhibits the feedback value to grow higher than the upper limit value.

<Aspect 4>

Figure 8:
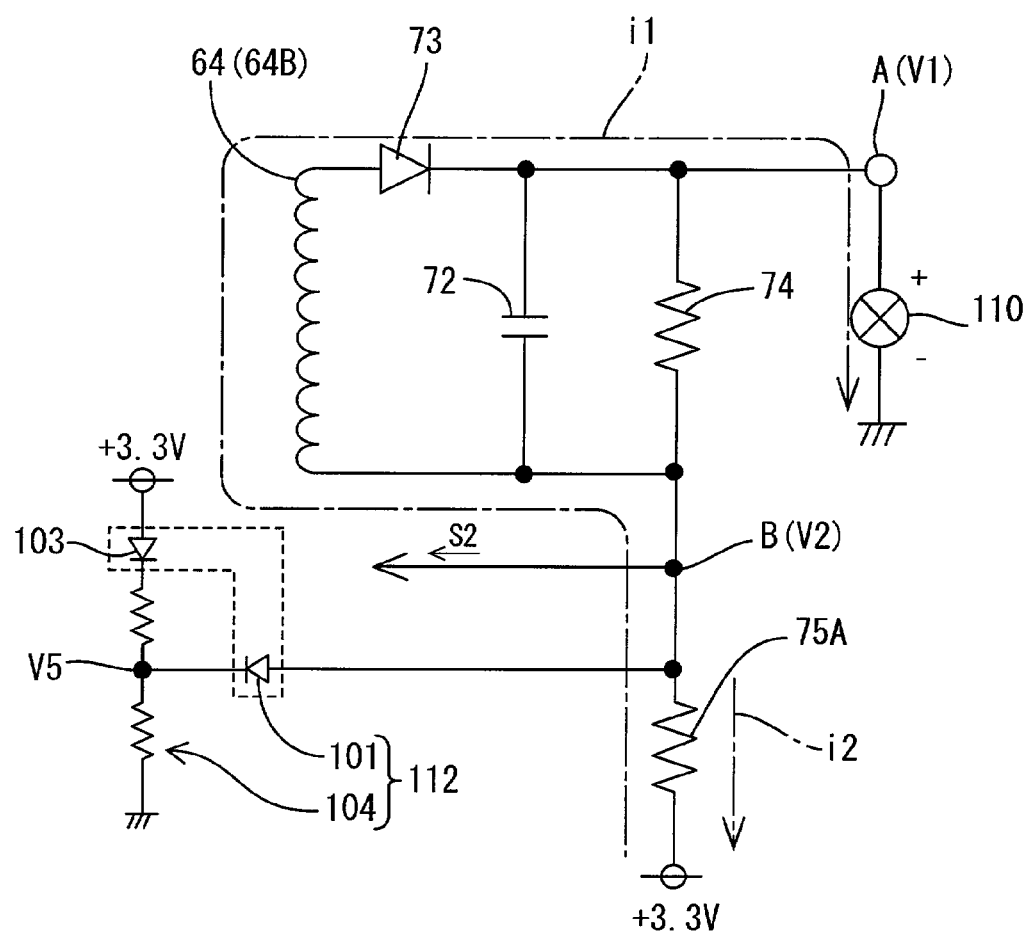
FIG. 8 is a circuit diagram illustrating a main part structure of an applying circuit according to Aspect 4 of the present invention.

FIG. 8 shows Aspect 4. With respect to Aspect 2, in which a negative voltage of an electrical load 110 is applied, a positive voltage is applied in Aspect 4, and thus, the configuration of an inhibiting circuit is partially different. Therefore, a repetitive description is omitted by allocating the same symbols to the same elements as Aspect 2, thereby describing only the different elements.

In FIG. 8, a partial configuration in which a positive voltage is applied to the electrical load 110 is illustrated, and elements other than the inhibiting circuit 112 are same as those in FIG. 7. The first diode 101 is oppositely-connected in the inhibiting circuit 112 relative to the inhibiting circuit 100 in FIG. 6, and the second diode 103 is provided in the upstream side of a voltage division circuit in the voltage generating circuit 104. The generated voltage V5 of the voltage generating circuit 104 is given to the cathode (one example of the output side of the first rectifying device) of the first diode 101. This generated voltage V5 is set to a voltage (for example, less or equal to 2.6 [v]), in which the threshold voltage of the first diode 101 (about 0.7 [v]) is subtracted from the upper limit value (for example, less or equal to 3.3 [v]). Such a configuration as this inhibits the feedback value to grow higher than the upper limit value.

<Other Aspects>

The present invention is not limited to the aspects described above with reference to the accompanying figures, and, for example, the following can also be included within the technical scope of the present invention. (1) Other than the transfer roller 30 given as an example in the above-mentioned aspects, for example, the developing roller 31 or the charger 29 may be employed as an "electrical load".

(2) Other than the diode itself given as an example in the above-mentioned aspects, for example, a diode-connected bipolar transistor may be employed as a "rectifying device".

What is claimed is:

1. An image forming apparatus comprising:
    an electrical load,
    a supplying circuit configured to supply an electrical power to the electrical load,
    an output circuit configured to output a voltage according to a current value of the electrical power being supplied to the electrical load,
    a controller configured to control an electrical current flowing in the electrical load based on an output voltage value of the output circuit as a feedback value, and
    an inhibiting circuit configured to inhibit a reverse current to flow in the output circuit when the supplying circuit is turned off.

2. An image forming apparatus according to claim 1, wherein
    the supplying circuit applies a negative voltage to the electrical load, and
    the inhibiting circuit inhibits the feedback value to decrease lower than a positive lower limit value when the feedback value decreased to the positive lower limit value, by supplying an electrical current to the electrically load from a different path than the path with the output circuit provided therein.

3. An image forming apparatus according to claim 2, wherein
    the inhibiting circuit has an operational amplifier that is provided in the different path and has a rectifying device in its feedback loop, and is configured to supply an electrical current to the electrically load from the operational amplifier when the feedback value decreases to the positive lower limit value.

4. An image forming apparatus according to claim 2, wherein
    the inhibiting circuit has a first rectifying device that is provided in the different path, and to which an input voltage higher than a threshold voltage of the first rectifying device is given, and is configured to supply an electrical current to the electrically load from the rectifying device when the feedback value decreases to the positive lower limit value.

5. An image forming apparatus according to claim 4 further comprising:
    a generating circuit, which has a second rectifying device, for generating a voltage as the input voltage including an amount of forward voltage of the second rectifying device.

6. An image forming apparatus according to claim 5, wherein
    the first rectifying device and the second rectifying device are provided inside of the same package.

7. An image forming apparatus according to claim 2, wherein the positive lower limit value is set to be smaller than a feedback value at the time when the electrical load is in operation.

8. An image forming apparatus according to claim 2, wherein
the controller determines an irregularity if a feedback value at the time when the electrical load is at rest is higher than a reference value and
the positive lower limit value is set to be less or equal to the reference value.

9. An image forming apparatus according to claim 1, wherein
the supplying circuit applies a positive voltage to the electrical load, and
the inhibiting circuit inhibits the feedback value to grow higher than the upper limit value when the feedback value reaches the upper limit value, by supplying an electrical current flowing from the electrical load to a different path than the path with the output circuit provided therein.

10. An image forming apparatus according to claim 9, wherein
the inhibiting circuit has an operational amplifier that is provided in the different path and has a rectifying device in its feedback loop, and is configured to supply an electrical current flowing from the electrically load to the operational amplifier when the feedback value reaches the upper limit value.

11. An image forming apparatus according to claim 9, wherein
the inhibiting circuit has a first rectifying device provided in the different path, and to an output side of the first rectifying device, a voltage lower than the voltage, in which a threshold voltage of the first rectifying device is subtracted from the upper limit value, is given, and is configured to supply an electrical current flowing from the electrically load to the operational amplifier when the feedback value reaches the upper limit value.

* * * * *